S. DIESCHER.
CRIB FOR FILTERS.
APPLICATION FILED APR. 23, 1908.

922,101.

Patented May 18, 1909.
2 SHEETS—SHEET 1.

WITNESSES:
J. Herbert Bradley.
Charles Barnett

INVENTOR
Samuel Diescher
by Christy and Christy
Att'ys

S. DIESCHER.
CRIB FOR FILTERS.
APPLICATION FILED APR. 23, 1908.

922,101.

Patented May 18, 1909.
2 SHEETS—SHEET 2.

WITNESSES:
J. Herbert Bradley.
Charles Barrett.

INVENTOR
Samuel Diescher
by Christy and Christy
Attys.

UNITED STATES PATENT OFFICE.

SAMUEL DIESCHER, OF PITTSBURG, PENNSYLVANIA.

CRIB FOR FILTERS.

No. 922,101.　　　　Specification of Letters Patent.　　　Patented May 18, 1909.

Application filed April 23, 1908. Serial No. 428,755.

*To all whom it may concern:*

Be it known that I, SAMUEL DIESCHER, residing at Pittsburg, in the county of Allegheny and State of Pennsylvania, a citizen of the United States, have invented or discovered certain new and useful Improvements in Cribs for Filters, of which improvement the following is a specification.

Cribs for filtering the water from rivers etc., are sunk in pockets dredged in the bottom of the river and are generally made of considerable length in proportion to its width and the pipe or conduit for carrying away the filtered water is connected at a point approximately midway of its length. In such a construction water will flow more rapidly through the filtering material closely adjacent to the outlet than at points farther removed. As the larger part of the supply comes through the material adjacent to the outlet, the flow of water will be too high and sand and other foreign matter will be carried through to the outlet and thence to the point or points of use. In other words some portions of the filter will become practically useless while other portions will be ineffective as the water will flow through too rapidly, in consequence of which the crib would gradually fill with sand etc.

The object of the invention described herein is to provide a main body of filtered water which is supplied or maintained by water flowing through filtering material arranged around the main body of filtered water and equidistant or approximately equidistant at all points from the outlet of the filter.

The invention is hereinafter more fully described and claimed.

Figure 1:
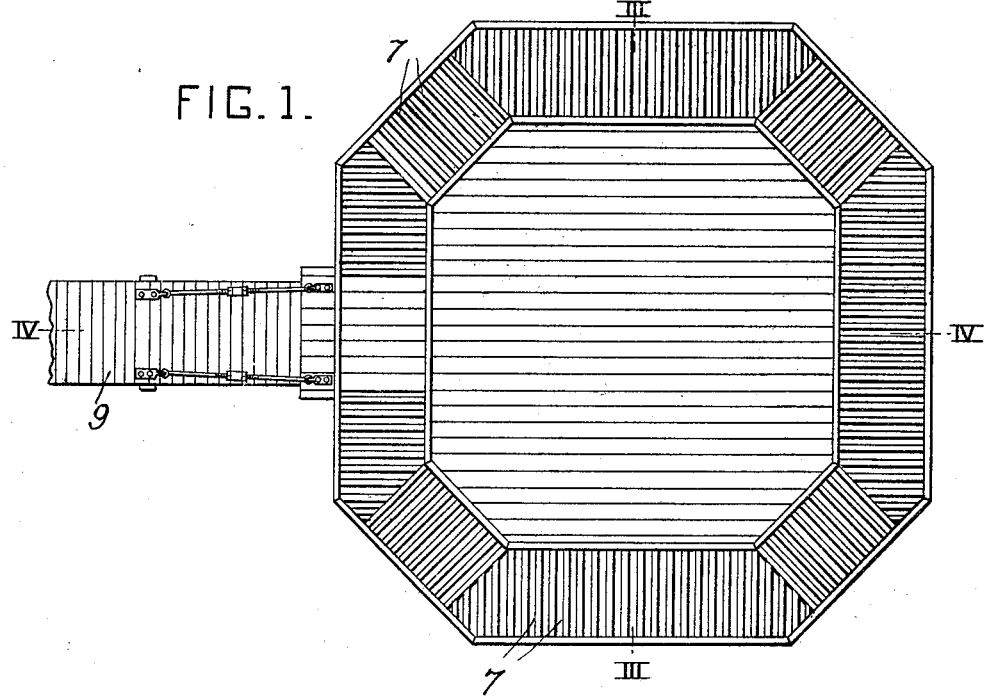
Figure 2:
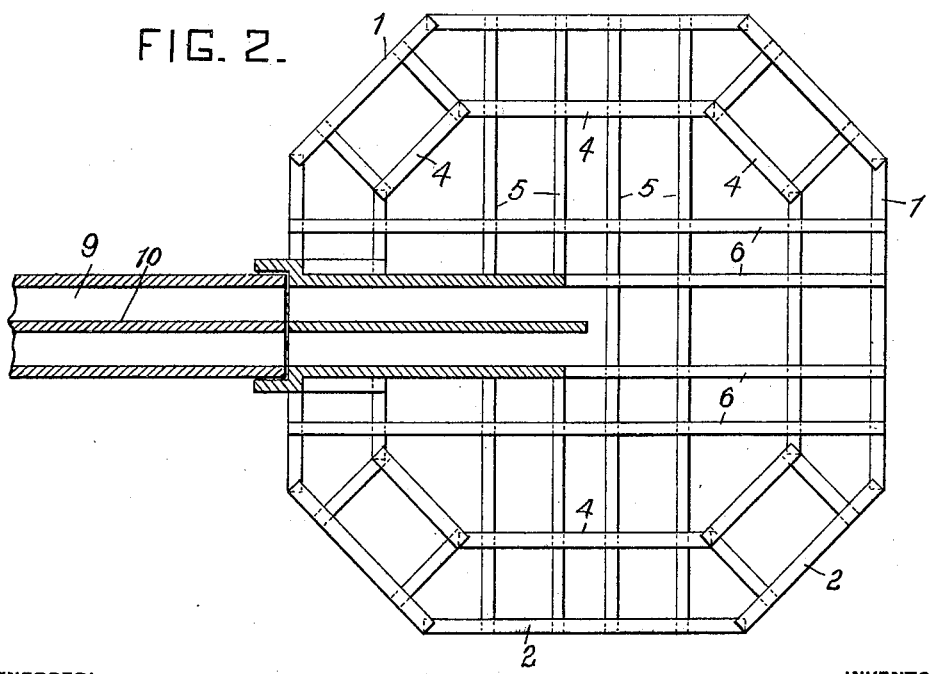
Figure 3:
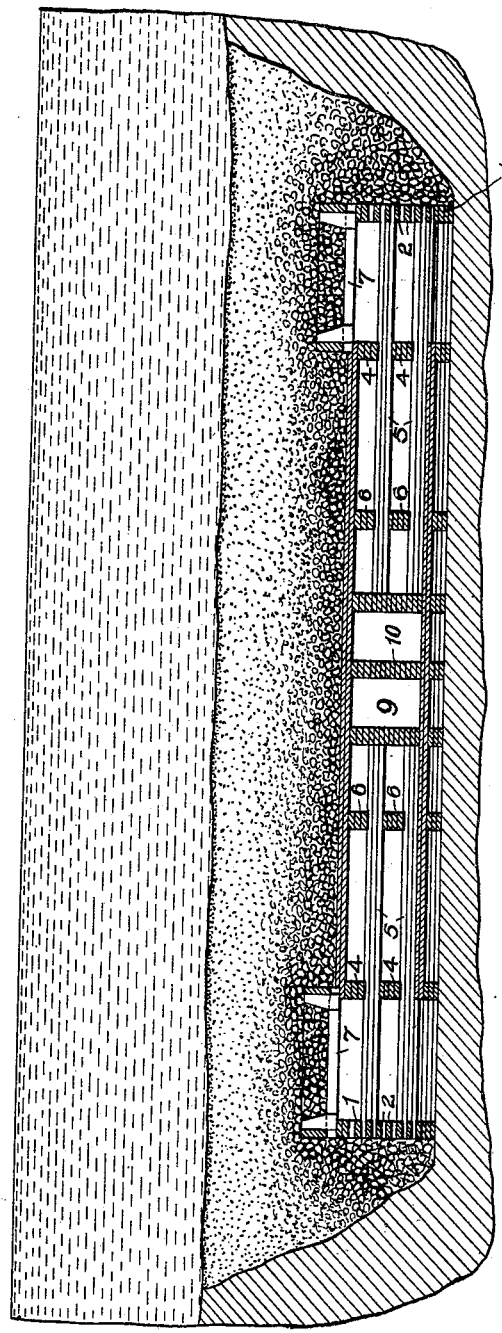
Figure 4:
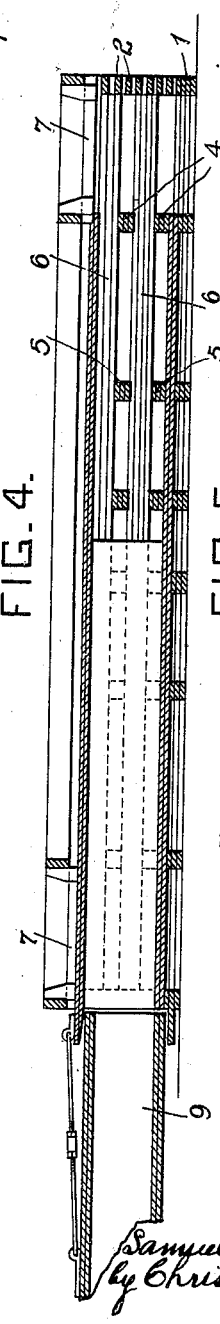
Figure 5:
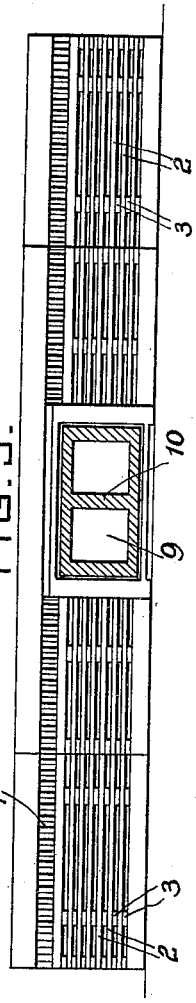

In the accompanying drawings forming a part of this specification Figure 1 is a top plan view of my improved crib for filters; Fig. 2 is a sectional plan view, Figs. 3 and 4 are sectional elevations in planes indicated respectively by the lines III—III and IV—IV Fig. 1 and Fig. 5 is an elevation of the crib.

In the practice of my invention the outer wall or curtain 1 of the crib which is of such shape and dimensions that the outlet pipe will be equidistant or approximately so from all points of the perimeter of the crib, is perforated or has openings therethrough for the inflow of water. This wall or curtain is preferably built of planks 2 laid horizontally and spaced a suitable distance apart by blocks 3. A partition 4 having openings therethrough is arranged within the outer wall or curtain and preferably parallel therewith, the chamber between the curtain and partition being termed for convenience of description a receiving chamber. The partition 4 consists of solid timbers, or members formed by spiking planks together arranged one above the other and spaced a distance apart preferably by means of bracing timbers 5 and 6 extending across the crib. The timbers or members forming the partition alternate with the bracing timbers 5 and 6. It will be observed that the cross or bracing timbers 5 are at an angle to and alternate with the other series of cross timbers 6. These series of cross timbers not only brace the partition and curtain or outer walls, but also form supports for the bottom and top of the central or storage chamber. The top and bottom of this central chamber should be made tight so as to prevent the entrance of water except through the partition walls 4 and consist by preference of two courses of planks laid to break joints and secured to the cross timbers. The top of the annular receiving chamber is formed by planks 7 arranged on edge and spaced a distance apart so as to permit of the inflow of water. In case there is no flow of hard water up through the bottom of the stream or pond in which the filter is located, the annular area in the bottom of the receiving chamber will also be formed of planks arranged on edge and spaced a distance apart, or left entirely open.

The outlet may be formed by one or more pipes or conduits, but is preferably a rectangular conduit 9 formed of wood and when necessary, strengthened by a center partition 10. This outlet enters horizontally through the outer wall or curtain and extends to the center of the central or storage chamber so that when water is drawn from the conduit there will be an equal pull at all points of the perimeter of the crib.

While not necessary to the use of my improved crib, it is preferred to dredge out a bed for it in the stream or pond. When this bed is prepared the crib is floated over the place prepared for it and then weighted by stones etc., to sink it into position in the excavation. The character of the material placed on the central closed portion is immaterial, but the material placed above the grating of the annular receiving chamber should be carefully selected and should be too large to pass through the openings in the top of this chamber. When the crib has been sunk to its final position broken stone or gravel is placed around the sides of the crib, the gravel or stone being too large to pass through the openings in the outer walls or curtains of the crib. While as stated the gravel or stone should be too large to pass through the top and sides of the receiving chamber it should be as small as compatible with the condition above stated, as the smaller the stone or gravel the more efficient the filter. The gravel or broken stone and gravel is next covered with finer stone or gravel and sand.

For the purpose of properly covering the grating with filtering material and for its uniform spreading over that area, planks set on edge are spiked along the inner and outer circumference of said area, by means of which that loose material is held in place. This spreading of that material is most conveniently and satisfactorily done while the top of the crib is still above water.

It will be observed that the filtering areas, that is, the combined areas of the sides and top of the receiving chamber, are large relative to the cross sectional area of the discharge conduit and that these filtering areas are so arranged relative to the inlet of the discharge conduit, that the inlet end of the conduit is practically equidistant from all points of such filtering areas. It follows from the described relations of the filtering areas and the outlet that the flow of water through the filter be slow while the rate of discharge is large so that there will not be any liability of fine sand, grit or other foreign material being forced through the filtering material; and that this slow flow of the water will be the same at all points.

The arrangement of the interior timbering, as the transverse members 5 and 6 is not material, provided the outer wall, or curtain 1 and the partition 4 be properly braced and a sufficient support for the top and bottom of the central or storage chamber be afforded. While spikes or other suitable fastening devices are necessary in framing the crib, the latter is so constructed that when embedded in the filtering material the parts will be held together and in proper relation by such filtering material.

It will be understood that while the part 4 is referred to as a partition it does not perform the usual function of a partition, i. e., dividing a given space into two chambers or compartments, as it is formed of spaced timbers, but its principal office or function is to support the outer perimeter of the central covered space and the inner periphery of the annular top grating.

I claim herein as my invention:

1. A filter adapted to be arranged in the beds of rivers, etc., consisting of crib work having the central portion of its upper side closed as against the inflow of water, and having its peripheral portion constructed to support filtering material and permit the inflow of water to the closed portion of the crib-work in combination with an outlet conduit, the latter and the portions supporting the filter material being arranged in such relation to each other that the flow of water through the filtering material will be substantially the same at all points.

2. A filter adapted to be arranged in the beds of rivers etc., consisting of crib-work having the central portion of its upper side closed as against the inflow of water, and having horizontally and vertically disposed perforated or slatted portions around the closed portion in combination with filtering material supported by the perforated or slatted portions, and an outlet conduit having its inner end equidistant or approximately equidistant from all the filtering walls.

In testimony whereof, I have hereunto set my hand.

SAMUEL DIESCHER.

Witnesses:
FRANCIS J. TOMASSON,
CHARLES BARNETT.